US008812314B2

(12) United States Patent
Kroeker et al.

(10) Patent No.: US 8,812,314 B2
(45) Date of Patent: *Aug. 19, 2014

(54) METHOD OF AND SYSTEM FOR IMPROVING ACCURACY IN A SPEECH RECOGNITION SYSTEM

(75) Inventors: John Kroeker, Hamilton, MA (US); Oleg Boulanov, Beverly, MA (US)

(73) Assignee: ELIZA Corporation, Beverly, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/616,874

(22) Filed: Nov. 12, 2009

(65) Prior Publication Data

US 2010/0100378 A1    Apr. 22, 2010

Related U.S. Application Data

(63) Continuation of application No. 09/918,733, filed on Jul. 31, 2001, now Pat. No. 7,624,010.

(60) Provisional application No. 60/221,737, filed on Jul. 31, 2000.

(51) Int. Cl.
*G10L 15/22*    (2006.01)

(52) U.S. Cl.
CPC ...................................... *G10L 15/22* (2013.01)
USPC ........................................................ 704/235

(58) Field of Classification Search
USPC ........ 704/235, 260, 257, 270, 275; 379/88.01
See application file for complete search history.

(56) References Cited

U.S. PATENT DOCUMENTS

| 4,430,726 | A |   | 2/1984  | Kasday |
|-----------|---|---|---------|--------|
| 4,831,554 | A |   | 5/1989  | Storace et al. |
| 5,033,088 | A |   | 7/1991  | Shipman et al. |
| 5,163,085 | A |   | 11/1992 | Sweet et al. |
| 5,428,707 | A |   | 6/1995  | Gould et al. |
| 5,577,165 | A | * | 11/1996 | Takebayashi et al. ........ 704/275 |
| 5,675,706 | A |   | 10/1997 | Lee et al. |
| 5,729,694 | A |   | 3/1998  | Holzrichter et al. |
| 5,745,877 | A |   | 4/1998  | Nijmam et al. |
| 5,799,267 | A |   | 8/1998  | Siegel |
| 5,799,273 | A |   | 8/1998  | Mitchell et al. |
| 5,799,279 | A |   | 8/1998  | Gould et al. |

(Continued)

OTHER PUBLICATIONS

International Search Report for PCT/US2001/23965, International Filing Date Jul. 31, 2001, Applicant: Eliza Corporation.

(Continued)

*Primary Examiner* — Michael N Opsasnick
(74) *Attorney, Agent, or Firm* — McDermott Will & Emery LLP

(57) ABSTRACT

A method for transcribing an audio response includes: A. constructing an application including a plurality of queries and a set of expected responses for each query, the set including a plurality of expected responses to each query in a textual form; B. posing each of the queries to a respondent with a querying device; C. receiving an audio response to each query from the respondent; D. performing a speech recognition function on each audio response with an automatic speech recognition device to transcribe each audio response to a textual response to each query; E. recording each audio response with a recording device; and F. comparing, with the automatic speech recognition device, each textual response to the set of expected responses for each corresponding query to determine if each textual response corresponds to any of the expected responses in the set of expected responses for the corresponding query.

31 Claims, 3 Drawing Sheets

(56) References Cited

U.S. PATENT DOCUMENTS

| | | | |
|---|---|---|---|
| 5,884,263 | A | 3/1999 | Aaron et al. |
| 5,909,665 | A | 6/1999 | Kato |
| 5,915,001 | A | 6/1999 | Uppaluru |
| 5,960,399 | A | 9/1999 | Barclay et al. |
| 5,974,116 | A | 10/1999 | Engelke et al. |
| 5,983,177 | A | 11/1999 | Wu et al. |
| 6,023,675 | A | 2/2000 | Bennett et al. |
| 6,044,347 | A * | 3/2000 | Abella et al. ............ 704/275 |
| 6,064,957 | A | 5/2000 | Brandow et al. |
| 6,067,517 | A | 5/2000 | Bahl et al. |
| 6,122,614 | A | 9/2000 | Kahn et al. |
| 6,246,981 | B1 * | 6/2001 | Papineni et al. ......... 704/235 |
| 6,314,165 | B1 | 11/2001 | Junqua et al. |
| 6,366,886 | B1 | 4/2002 | Dragosh et al. |
| 6,480,598 | B1 | 11/2002 | Reding et al. |
| 6,510,411 | B1 * | 1/2003 | Norton et al. ............ 704/254 |
| 6,725,194 | B1 | 4/2004 | Bartosik et al. |
| 6,754,631 | B1 | 6/2004 | Din |
| 6,842,767 | B1 | 1/2005 | Partovi et al. |
| 6,970,915 | B1 | 11/2005 | Partovi et al. |
| 7,006,967 | B1 | 2/2006 | Kahn et al. |

OTHER PUBLICATIONS

Supplementary EP Search Report for EP Application No. EP01957345 Dated Oct. 27, 2005.

* cited by examiner

METHOD OF AND SYSTEM FOR IMPROVING ACCURACY IN A SPEECH RECOGNITION SYSTEM

CROSS REFERENCES TO RELATED APPLICATIONS

The present application is a continuation of U.S. application Ser. No. 09/918,733 filed 31 Jul. 2001, now U.S. Pat. No. 7,624,010, which claims priority under 35 U.S.C. §119 (e) of U.S. Provisional Patent Application No. 60/221,737 filed 31 Jul. 2000; the entire contents of all of which applications are incorporated herein by reference.

FIELD OF THE INVENTION

The present invention relates generally to a method of and system for improving accuracy in a speech recognition system and more particularly to a method of and system for simultaneously recording response phrases which are undergoing a speech recognition process for later review.

BACKGROUND OF THE INVENTION

In the new, connected economy, it has become increasingly important for companies or service providers to become more in tune with their clients and customers. Such contact can be facilitated with automated telephonic transaction systems, in which interactively-generated prompts are played in the context of a telephone transaction, and the replies of a human user are recognized by an automatic speech recognition system. The answers given by the respondent are processed by the system in order to convert the spoken words to meaning, which can then be utilized interactively, or stored in a database.

In order for a computer system to recognize the words that are spoken and convert these words to text, the system must be programmed to phonetically break down the words and convert portions of the words to their textural equivalents. Such a conversion requires an understanding of the components of speech and the formation of the spoken word. The production of speech generates a complex series of rapidly changing acoustic pressure waveforms. These waveforms comprise the basic building blocks of speech, known as phonemes. Vowel and consonant sounds are made up of phonemes and have many different characteristics, depending on which components of human speech are used. The position of a phoneme in a word has a significant effect on the ultimate sound generated. A spoken word can have several meanings, depending on how it is said. Speech scientists have identified allophones as acoustic variants of phonemes and use them to more explicitly define how a particular word is formed.

While there are several distinct methods for analyzing the spoken word and extracting the information necessary to enable the recognition system to convert the speech to word-strings, including Hidden Markov modeling and neural networks, these methods generally perform similar operations. The differences in these methods are typically in the manner in which the system determines how to break the phonetic signal into portions that define phonemes. Generally, a speech recognition system first converts an incoming analog voice signal into a digital signal. The second step is called feature extraction, wherein the system analyzes the digital signal to identify the acoustic properties of the digitized signal. Feature extraction generally breaks the voice down into its individual sound components. Conventional techniques for performing feature extraction include subband coding Fast Fourier Transforms and Linear Predictive Coding. Once the signal has been analyzed, the system then determines where distinct acoustic regions occur. The goal of this step is to divide the acoustic signal into regions that will be identified as phonemes which can be converted to a textual format. In isolated word systems, this process is simplified, because there is a pause after each word. In continuous speech systems, however, this process is much more difficult, since there typically are no breaks between words in the acoustic stream. Accordingly, the system must be able not only to break the words themselves into distinct acoustic regions, but must also be able to separate consecutive words in the stream. It is in this step that conventional methods such as Hidden Markov modeling and neural networks are used. The final step involves comparing a specific acoustic region, as determined in the previous step, to a known set of templates in a database in order to determine the word or word portion represented by the acoustic signal region. If a match is found, the resulting textual word is output from the system. If one is not, the signal can either be dynamically manipulated in order to increase the chances of finding a match, or the data can be discarded and the system prompted to repeat the query to the respondent, if the associated answer cannot be determined due to the loss of the data.

Many factors can adversely affect the accuracy of a speech recognition system, including the use of slang, regional dialects and accents, speech impediments, poor telephone connections and background noise. In many cases, even the most advanced speech recognition system will not be able to process such speech, and thus the loss of data is inevitable. One approach to this problem has been to limit the functionality of the speech recognition application. In this case, the users of the system must be trained to accommodate themselves to the limitations imposed by the system (e.g., state only a limited set of word replies). An extreme example of such a limited system is one in which the only response recognized by the system is a simple word or key stroke on the telephone, for example the prompt "Press or say one." At the other extreme is a system in which a human monitors the automatic speech recognition transaction for correctness. However, such a system defeats the entire purpose of an automated system, which is generally intended to reduce costs.

SUMMARY OF THE INVENTION

The present invention is directed to a method of and system for improving the accuracy of speech recognition systems by simultaneously recording audio response phrases as the phrases are being processed by the speech recognition system. If a predetermined confidence parameter in the recognition is reached, meaning that the particular word or phrase has been properly recognized by the system, the recorded phrase is not needed. However, if the audio response is not properly recognized, the recorded phrase is saved for human review at a later time. This system increases the accuracy of the speech recognition system without substantially increasing the cost of the system due to the need for human review, since only the phrases which are not properly recognized need be selectively reviewed.

According to one aspect of the invention, a speech recognition system includes a querying device for posing, preferably in the form of an audio prompt, at least one query to a respondent, a speech recognition device which receives an audio response from the respondent and transcribes the audio response to produce a corresponding text-based response, and a storage device for storing the audio response as it is received by the speech recognition device.

The speech recognition system may further include an accuracy determination device for comparing the text response to a text set of expected responses and determining whether the text response corresponds to one of the expected responses. If the accuracy determination device determines that the text response does not correspond to one of the expected responses within a predetermined accuracy confidence parameter, the accuracy determination device may flag the audio response for further review. The speech recognition system may further include a human interface device for enabling a human operator to view the at least one query and to hear the audio response that corresponds to the at least one query. The human interface device may include a personal computer including a monitor for enabling the operator to view the at least one query and an audio speaker device for enabling the operator to listen to the audio response. The querying device may include a program having an application file, including code which causes the at least one query to be posed to the respondent, a list of expected responses and an address at which a file containing the received audio response will be stored in the storage device. The human interface device may include a graphical user interface on which the operator views the at least one query and the text set of expected responses wherein, after listening to the audio response, the operator is able to select one of the expected responses from the text set of expected responses. The graphical user interface may include an application navigation window for enabling the operator to navigate through the at least one query, an audio navigation window for enabling the operator to control playback of the audio response and a text entry window which enables the operator to enter a text response if none of the expected responses from the text set of expected responses corresponds to the audio response.

According to another embodiment of the invention, a speech recognition system includes a querying device for posing at least one query to a respondent, a speech recognition device which receives an audio response from the respondent and transcribes the audio response to produce a corresponding text response, a storage device for storing the audio response as it is received by the speech recognition device and an accuracy determination device for comparing the text response to a text set of expected responses and determining whether the text response corresponds to one of the expected responses.

If the accuracy determination device determines that the text response does not correspond to one of the expected responses within a predetermined accuracy confidence parameter, the accuracy determination device may flag the audio response for further review. The speech recognition system may further include a human interface device for enabling a human operator to view the at least one query and to hear the audio response that corresponds to the at least one query. The human interface device may include a personal computer including a monitor for enabling the operator to view the at least one query and an audio speaker device for enabling the operator to listen to the audio response. The querying device may include a program having an application file, the application file including code which causes the at least one query to be posed to the respondent, a list of expected responses and an address at which a file containing the received audio response will be stored in the storage device. The human interface device may include a graphical user interface on which the operator views the at least one query and the text set of expected responses wherein, after listening to the audio response, the operator is able to select one of the expected responses from the text set of expected responses. The graphical user interface may include an application navigation window for enabling the operator to navigate through the at least one query, an audio navigation window for enabling the operator to control playback of the audio response and a text entry window which enables the operator to enter a text response if none of the expected responses from the text set of expected responses corresponds to the audio response.

According to another embodiment of the invention, a method for transcribing an audio response includes:
  A. posing a query to a respondent;
  B. receiving an audio response from the respondent;
  C. performing a speech recognition function on the audio response to transcribe the audio response to a textual response;
  D. recording the audio response;
  E. comparing the textual response to a set of expected responses to the query, the set including a plurality of expected responses to the query in a textual form; and
  F. flagging the audio response if the corresponding textual response does not correspond to one of the expected responses in the set of expected responses.

The method may further include the steps of:
  G. listening to the audio response; and
  H. selecting, from the set of expected responses, a textual response that corresponds to the audio response.

The method may further include the steps of:
  G. listening to the audio response; and
  H. manually transcribing a textual response that corresponds to the audio response.

According to yet another embodiment of the invention, a method for transcribing an audio response includes:
  A. constructing an application including a plurality of queries and a set of expected responses for each query, the set including a plurality of expected responses to each query in a textual form;
  B. posing each of the queries to a respondent;
  C. receiving an audio response to each query from the respondent;
  D. performing a speech recognition function on each audio response to transcribe each audio response to a textual response to each query;
  E. recording each audio response; and
  F. comparing each textual response to the set of expected responses for each corresponding query to determine if each textual response corresponds to any of the expected responses in the set of expected responses for the corresponding query.

The method may further include flagging each audio response corresponding to a textual response that does not correspond to one of the expected responses in the set of expected responses to the corresponding query. The method may further include reviewing each flagged audio response to determine if a corresponding expected response is included in the set of expected responses for the query associated with each audio response. The method may further include selecting, from an associated set of expected responses for each query, a response that corresponds to the flagged audio response and manually transcribing a response that corresponds to each flagged audio response.

According to yet another aspect of the invention, a method for transcribing an audio response comprising:
  A. constructing a speech recognition application including a plurality of queries and a set of expected responses for each query, the set including a plurality of expected responses to each query in a textual form;
  B. posing each of the queries to a respondent with a querying device;

C. receiving an audio response to each query from the respondent;

D. performing a speech recognition function on each audio response with an automatic speech recognition device to transcribe each audio response to a textual response to each query;

E. recording each audio response with a recording device; and

F. comparing, with the automatic speech recognition device, each textual response to the set of expected responses for each corresponding query to determine if each textual response corresponds to any of the expected responses in the set of expected responses for the corresponding query.

BRIEF DESCRIPTION OF THE DRAWINGS

The foregoing and other objects of this invention, the various features thereof, as well as the invention itself may be more fully understood from the following description when read together with the accompanying drawings in which.

DETAILED DESCRIPTION

The present invention is directed to a speech recognition system which simultaneously performs a speech recognition process on received responses to queries and records the responses. As the responses are processed and converted from audio form to text, they are analyzed to determine if they meet a predetermined recognition confidence parameter. If the text form of the response meets the confidence parameter, meaning that the system has properly recognized and converted the audio response to the corresponding text response, the systems continues with the next query. If the system determines that the converted text phrase does not meet the confidence parameter, the query and the recorded audio response are flagged for human review at a later time.

Figure 1:
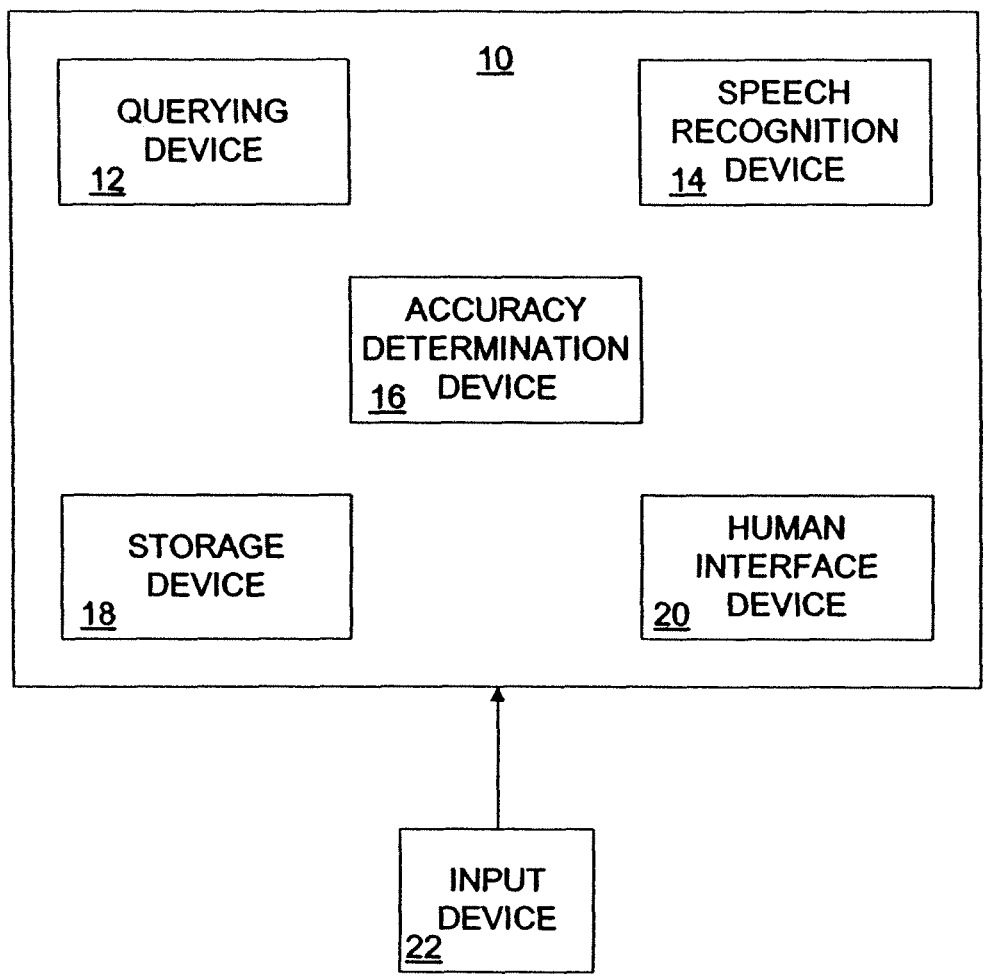
FIG. 1 is a schematic block diagram of the system for improving the accuracy of a speech recognition system in accordance with the present invention.

FIG. 1 is a schematic block diagram of the system 10 for improving the accuracy of a speech recognition system in accordance with the present invention. System 10 includes a querying device 12, a speech recognition device 14, an accuracy determination device 16, a storage device 18 and a human interface device 20. Preferably, the system 10 is a personal computer such as an IBM PC or IBM PC compatible system or an APPLE MacINTOSH system or a more advanced computer system such as an Alpha-based computer system available from Compaq Computer Corporation or SPARC Station computer system available from SUN Microsystems Corporation, although a main frame computer system can also be used. In such a system, all of the components of the system will reside on the computer system, thus enabling the system to independently process data received from a respondent in the manner described below. Alternatively, the components may be included in different systems that have access to each other via a LAN or similar network. For example, the system may include a plurality of human interface devices 20, each comprising a personal computer having access to memory associated with one or more storage devices 18. The querying device 12 may reside on a server system which receives the audio response from the respondent and transmits the response to the speech recognition device 14 and to memory associated with the storage device 18.

The system 10 may also include a network interface that facilitates receipt of audio information by any of a variety of a networks, such as telephone networks, cellular telephone networks, the Web, Internet, local area networks (LANs), wide area networks (WANs), private networks, virtual private networks (VPNs), intranets, extranets, wireless networks, and the like, or some combination thereof. The system 10 may be accessible by any one or more of a variety of input devices 22 capable of communicating audio information. Such devices 22 may include, but are not limited to, a standard telephone (including cellular telephones), a laptop computer, or a desktop computer, as well as other audio enabled devices (e.g., personal digital assistants, audio receivers, and application servers).

Querying device 12 is an automated system on which a speech recognition application, including a series of acoustic outputs called prompts, which comprise queries about a particular topic, are programmed so that they can be presented to a respondent, preferably by means of a telephonic interaction between the querying party and the respondent. However, a speech recognition application may be any interactive application that collects, provides, and/or shares information. As examples, in the present invention, a speech application may be any of a group of interactive applications, including consumer survey applications; Web access applications; educational applications, including computer-based learning and lesson applications and testing applications; screening applications; consumer preference monitoring applications; compliance applications, including applications that generate notifications of compliance related activities, including notifications regarding product maintenance; test result applications, including applications that provide at least one of standardized tests results, consumer product test results, and maintenance results; and linking applications, including applications that link two or more of the above applications.

In the preferred embodiment, each speech recognition application includes an application file programmed into the querying device. Each application file includes code which causes the audio prompt to be played to the respondent, a list of expected responses and an address at which a file containing the received audio response will be stored in the storage device 18.

Preferably, the series of queries that make up the application is designed to obtain specific information from the respondents to aid in customer or consumer service, education and research and development of particular products or services or other functions. For example, a particular speech application could be designed to ask respondents specific queries about a particular product or service. The entity that issues the application may then use this information to further develop the particular product or service.

The operation of the system 10 will be described with reference to flow diagram 30, FIG. 2, which shows the steps involved in the operation of the system 10. After each prompt is issued by the querying device, step 32, the speech recognition device 14 receives the spoken, audio response from the respondent via input device 22, such as a telephone, and processes the audio response with a speech recognition algorithm to convert the spoken audio response to a text response, step 34.

While any type of speech recognition algorithm may be used in the present invention, speech recognition device 14 preferably performs syntactic and semantic processing using a rich semantic grammar (RSG) database (DB), which provides a source of word and grammar knowledge used to interpret the phonetic data. The grammars applied to a certain phonetic stream will vary depending on the expected response, which is typically a function of a prior prompt. The RSG DB includes a database of words and grammar rules related to the words, that is, including both syntactic and semantic data. The relationships include algorithms for combining words into meaningful phrases according to a given context. The RSG serves as a common, root grammar for the syntactic and semantic processing, which may each use its own representation of the RSG for its respective processing tasks. As a result, compatibility is ensured, since the semantic stages of processing will never receive an illegal word string, for example, from the syntactic processing stage. Additionally, to achieve greater efficiency, when multiple semantic phrases have the same syntax, a collapsed representation of the RSG can be used for searching.

The grammars of the RSG DB are organized as a tree of classes, as nodes, that represent words and phrase structures. A grammar tree may include a plurality of trees (or sub-trees). Generally, the RSG DB is context-free, because the rules applied to each sub-tree operate independently of the other parts of the tree. That is, each class (or node) includes rich semantic information (e.g., a semantic description) and a syntactic description. For purposes of syntactic searching and analysis, the RSG DB is represented as an optimized context free grammar (CFG) DB, where the grammars do not include the semantic information, but rather only include syntax information used to generate word lists. This stripped down version of the RSG DB allows for more efficient syntactic analysis.

System 10, in addition to processing the received audio response, records the response and stores it in recording device 18, step 36. In step 38, the accuracy determination device 16 analyzes the text response. Preferably, this is done by comparing the converted text response to a number of expected responses to the particular query. As set forth above, the application is typically specific to a particular topic such that each query will have an expected range of proper responses. For example, if a query asked what feature of a particular product a consumer was interested in, the response would be expected to be one of a number of common features for that product. If the system 10 determines that the converted text response matches one of the expected responses and therefore meets the confidence parameter for that query, step 40, the system determines whether further queries remain in the application, step 42. If there are, the method returns to step 32 and poses the next query to the respondent.

If, in step 40, the accuracy determining device 16 determines that the accuracy of the converted text response does not meet the confidence parameter, the response and its associated query are flagged, step 44, for human review at some time in the future. The level of accuracy required will depend on the type of queries being asked. Queries to which simple "yes" or "no" answers are expected will not require the same amount of accuracy needed for more complex responses. Therefore, responses which are expected to be more complex, for example, service experiences of a particular consumer respondent, perceptions of the respondent of a particular product, etc., require higher accuracy in the conversion from audio form to text form and therefore must meet higher confidence parameters in order not to be flagged in step 44. If further queries remain in the application, step 42, the method returns to step 32 and poses the next query to the respondent. If there are no further queries, human review of the responses recorded during the application begins, step 46.

Figure 3:
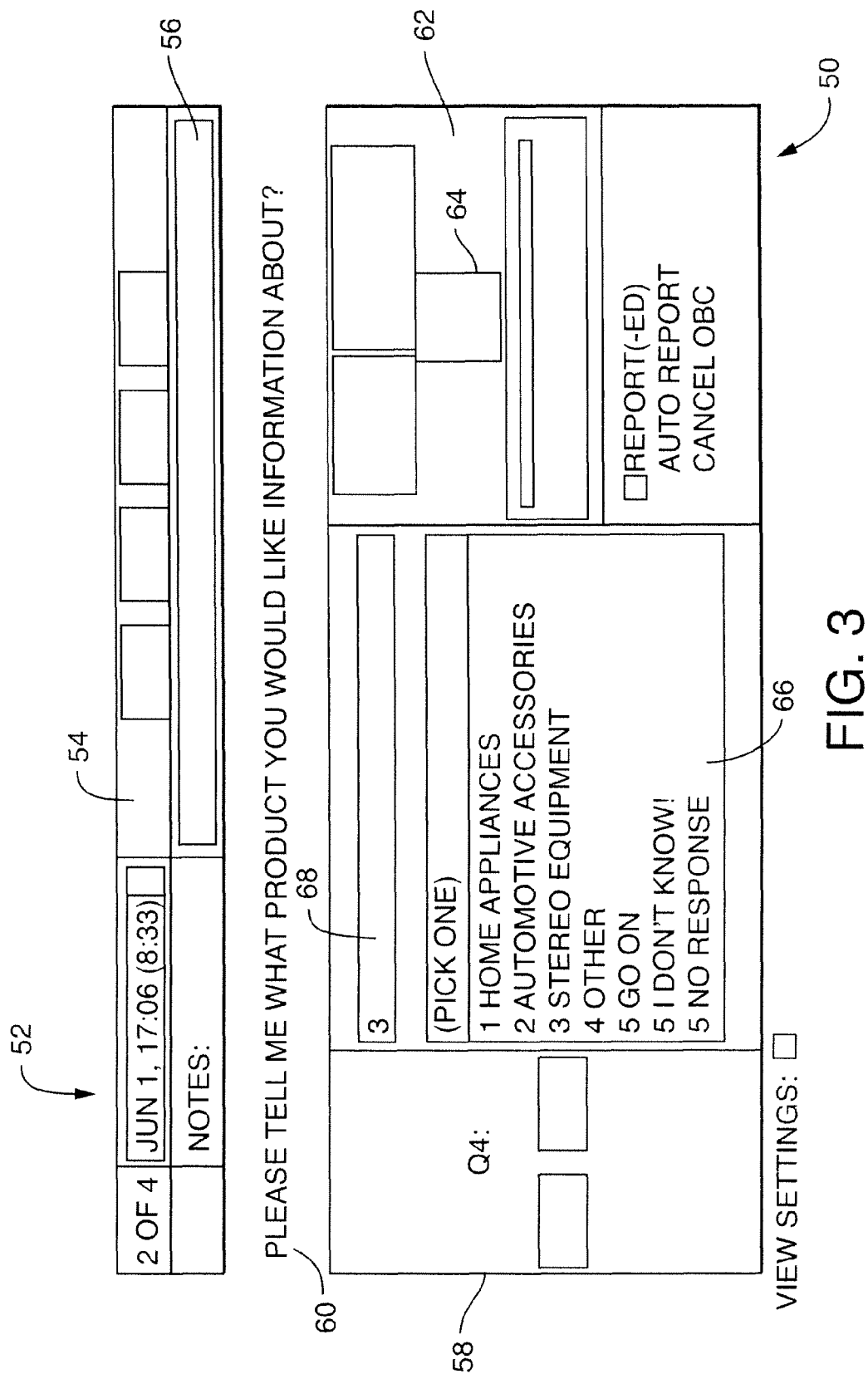
FIG. 3 is a diagram of a graphical user interface display associated with the human interface device of the system for improving the accuracy of a speech recognition system in accordance with the present invention.

FIG. 3 is a diagram of a graphical user interface display 50 associated with the human interface device 20 of the system 10, which is utilized by a human operator to review the queries and responses in an application. As set forth above, as each application is conducted, it is saved on storage device 18 of system 10. A human operator is then able to review each application to insure that the speech recognition device 14 has properly processed each received audio response and converted the audio response to a corresponding text response. As set forth above, human interface device 20 typically includes a personal computer having access to the storage device 18. Human interface device 20 also includes audio speakers which enable the human operator to listen to the audio responses received during the application being reviewed. As shown in the figure, display 50 provides information to the human operator regarding the application which enables the operator to review each query in an application and its corresponding response.

Display 50 includes an application information window 52 which provides information about a response set of the application being reviewed. Such information includes the number of a response set as part of the total number of response sets for the particular application being reviewed. In this example, the response set being reviewed is response set number 2 of 4 total response sets of a particular application. Window 52 includes the date and time that the application was completed and a navigation bar 54 which enables the operator to navigate through the response sets of the application. Window 52 also includes a notes portion 56 which enables the operator to enter any notes about the application response set and/or the respondent. Query navigation window 58 indicates which query is being reviewed, the text of which is shown at 60. Query navigation window 58 enables the operator to navigate forward and backward through the queries in the application. Audio navigation window 62 enables the operator to control the playback of the responses.

Figure 2:
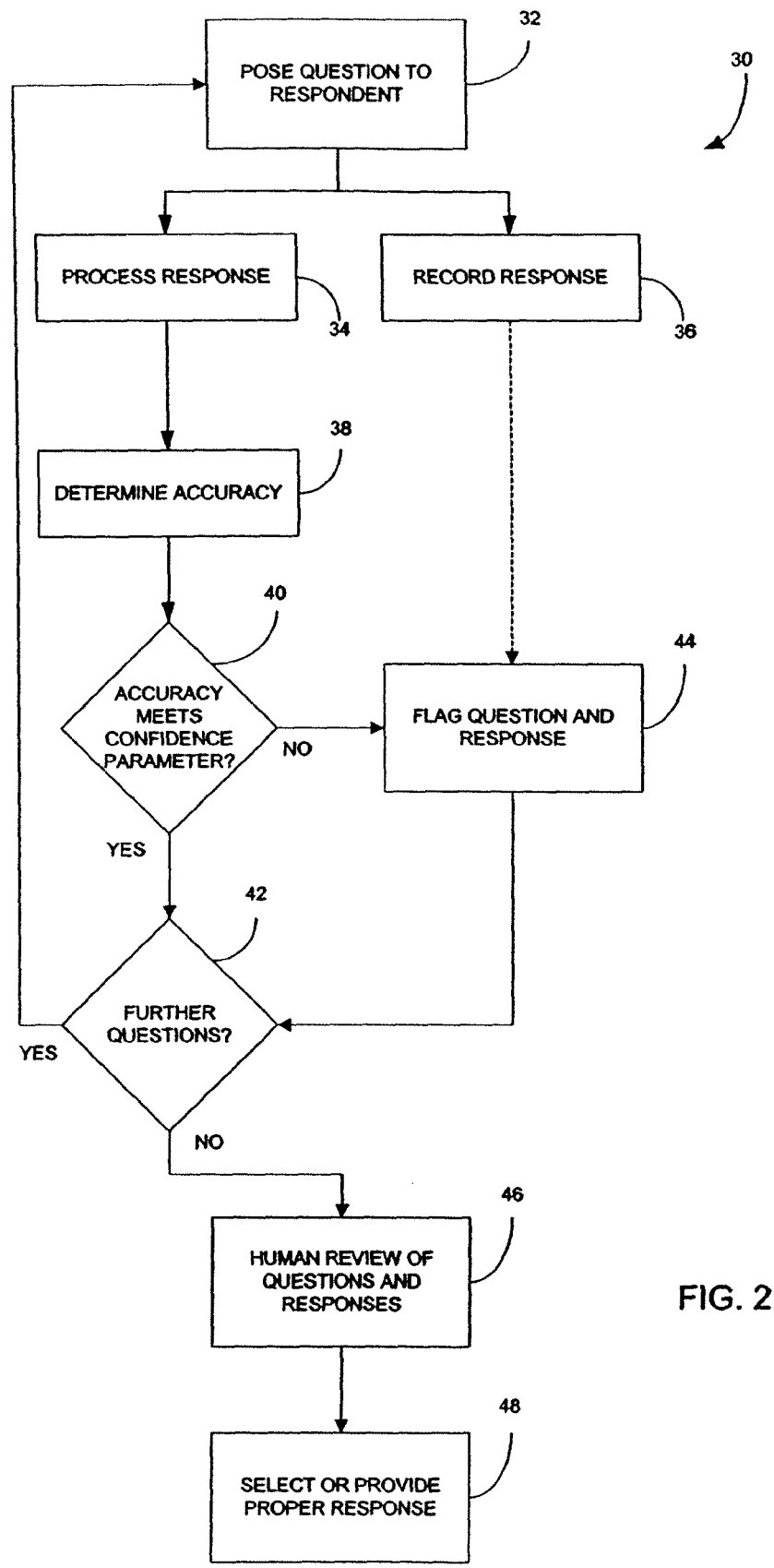
FIG. 2 is a flow diagram of the method for improving the accuracy of a speech recognition system in accordance with the present invention.

In step 46, FIG. 2, of the present invention, the operator connects to the storage device 18 with the human interface device 20 via the network, as described above. The operator can then download an application response file from the storage device 18 for review. As set forth above, each application includes a number of queries and an audio response associated with each query. The response file that is downloaded to the human interface device contains both the text version of each query in the application and an audio file that includes the respondent's response to each query. The response file also includes the set of expected responses associated with each query. The operator can then navigate through the queries, view each query, and listen to the audio response associated with the query. As set forth above, if the text form of the audio response, as processed by the speech recognition device 14, does not meet the predetermined accuracy confidence parameter, the query and its response are flagged for later review.

In the example shown in FIG. 3, Query 4 of an example application, is "Please tell us what product you would like information about?", as indicated at 60. Along with the query 60, the operator is presented with the set of expected responses in window 66. Window 66 also includes a box 68 into which the correct response may be manually input by the operator. After reading the query, the operator clicks on the "Play" button 64 to hear the audio response given by the respondent. Upon hearing and determining the response spoken by the respondent, the operator can either select one of the expected responses with a mouse click, or the operator can type the response into box 68, step 48, FIG. 2. If the operator desires to repeat the audio response, audio navigation window 62 may be used to replay all or a portion of the response. Typically, the response given by the respondent is not in the exact form of one of the expected responses. For example, in response to the query shown in FIG. 3, the respondent might say, "Well, I'm interested in refrigerators." Even if the speech recognition device 14 correctly transcribes the response, it is unlikely that the accuracy determination device 16 will be able to match the converted text response with one of the expected responses. In such a scenario, the operator will, after listening to the response, select "home appliances" from the expected responses box 66. If the operator determines that the response given by the respondent is not included in the expected response window 66, he or she can manually type the response into box 68, if the response is intelligible and relevant. The operator would then select the next query via navigation window 58.

If, for a particular query, the accuracy determination device determined that the converted text response matched one of the expected responses and therefore that the accuracy confidence parameter was met, step 40, FIG. 2, the query will not have been flagged in step 44. Accordingly, the query appears at 60 in display 50, but the expected response window 66 is inactive, thus preventing the operator from selecting a different response from that which was received and converted by speech recognition device 14. Alternatively, the system can be configured such that any unflagged queries are not presented to the operator for review.

In an alternative embodiment, rather than keeping every audio response received stored in the storage device 18 and flagging responses that require review, the system may, after determining that a converted text response meets the accuracy confidence parameter, delete the corresponding audio response from the storage device 18. During the review process, the operator is only presented with the responses that require further review, as determined by the accuracy determination device 16. Furthermore, the system can be programmed to record only certain ones of the received responses. If the expected response to a query is either "yes" or "no", or some other response which the speech recognition device can easily and correctly transcribe, the system can be programmed such that the response is processed and transcribed by the speech recognition device 14, but not recorded and stored in storage device 18. This enables the system to reduce the amount of memory required to conduct the application.

In yet another embodiment, the system can process the audio response with the speech recognition device 14 before it is recorded and, if the accuracy determination 16 device determines that the transcribed text response output by the speech recognition device 14 does not meet the accuracy confidence parameter, the querying device 12 can be prompted to repeat the query. When the respondent repeats his or her response, the response is recorded and stored in storage device 18. The response is processed again by the speech recognition device 14 and, if the accuracy determination device determines that the response still does not meet or exceed the accuracy confidence parameter, the response is flagged for further review. This embodiment further reduces the amount of memory required by only recording responses that require further review by a human operator.

While the preferred embodiment is described as a telephonic system, it will be understood that the invention is not limited to telephonic applications and may be utilized in any situation in which accuracy in a speech recognition system is critical. For example, the system 10 may be utilized for dictation, in which a user speaks into input device 22, which, in this example, may be a microphone. As the user speaks into the microphone and the audio signal is input to the speech recognition device for processing and transcription, the audio signal is simultaneously stored in storage device 18 for future review. After the dictation is complete, the user reviews the transcribed text produced by the speech recognition device. If any portion of the dictation was not properly transcribed by the speech recognition device 14, the user can review the stored audio signal that corresponds to the incorrect portion and make any necessary corrections.

Accordingly, the present invention provides a system which increases the accuracy of speech recognition applications. Since each audio response received from a respondent is simultaneously processed to convert the response from an audio form to a text form and recorded, if the system determines that a particular response does not meet a predetermined accuracy confidence threshold, the response is flagged for review by a human operator at a later time. During the review, the operator, with the aid of a human interface device, is able to view the queries of the application and listen to the audio form of the corresponding responses. The operator can then select from a group of expected responses, or manually input a response to the system that corresponds with the audio response given by the respondent.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

The invention claimed is:

1. A speech recognition system comprising:
a querying device for posing at least one query to a respondent;
a speech recognition device including a speak recognition application which receives an audio response from said respondent and transcribes said audio response to produce a corresponding text response, wherein the speech recognition device is operative to conduct a speaker-independent speech recognition analysis of said audio response, wherein the speech recognition device comprises means for processing of an acoustic file that is tied to database information resulting from the speech recognition application that audibly plays the acoustic file while presenting a screen to a transcriber for transcription and correction of the database information;
a storage device for storing said audio response as it is received by said speech recognition device; and
an accuracy determination device operative to compare said text response to a text set of expected responses and to determine whether said text response corresponds to one of said expected responses, wherein said accuracy determination device is operative to determine whether said text response does correspond to one of said expected responses within a predetermined accuracy confidence parameter, and flag said audio response for further review if said response does not correspond to one of said expected responses within the predetermined accuracy confidence parameter.

2. The speech recognition system of claim 1 further comprising a human interface device for enabling a human operator to view said at least one query and to hear said audio response that corresponds to said at least one query.

3. The speech recognition system of claim 2 wherein said human interface device comprises a personal computer including a monitor for enabling the operator to view said at least one query and an audio speaker device for enabling the operator to listen to said audio response.

4. The speech recognition system of claim 2 wherein said querying device includes a program having an application file, said application file including code which causes the at least one query to be posed to the respondent, a list of expected responses and an address at which a file containing the received audio response will be stored in the storage device.

5. The speech recognition system of claim 3 wherein said querying device includes a program having an application file, said application file including code which causes the at least one query to be posed to the respondent, a list of expected responses and an address at which a file containing the received audio response will be stored in the storage device.

6. The speech recognition system of claim 2 wherein said human interface device includes a graphical user interface on which the operator views said at least one query and said text set of expected responses wherein, after listening to said audio response, the operator is able to select one of said expected responses from said text set of expected responses.

7. The speech recognition system of claim 5 wherein said human interface device includes a graphical user interface on which the operator views said at least one query and said text set of expected responses wherein, after listening to said audio response, the operator is able to select one of said expected responses from said text set of expected responses.

8. The speech recognition system of claim 5 wherein said graphical user interface comprises an application navigation window for enabling the operator to navigate through said at least one query, and an audio navigation window for enabling the operator to control playback of said audio response.

9. The speech recognition system of claim 7 wherein said graphical user interface comprises an application navigation window for enabling the operator to navigate through said at least one query, and an audio navigation window for enabling the operator to control playback of said audio response.

10. The speech recognition system of claim 5 wherein said graphical user interface includes a text entry window which enables the operator to enter a text response if none of said expected responses from said text set of expected responses corresponds to said audio response.

11. The speech recognition system of claim 9 wherein said graphical user interface includes a text entry window which enables the operator to enter a text response if none of said expected responses from said text set of expected responses corresponds to said audio response.

12. A speech recognition system comprising:
a querying device for posing at least one query to a respondent;
a speech recognition device including a speech recognition application which receives an audio response from said respondent and transcribes said audio response to produce a corresponding text response, wherein the speech recognition device is operative to conduct a speaker-independent speech recognition analysis of said audio response, wherein the speech recognition device comprises means for processing of an acoustic file that is tied to database information resulting from the speech recognition application that audibly plays the acoustic file while presenting a screen to a transcriber for transcription and correction of the database information;
a storage device for storing said audio response as it is received by said speech recognition device; and
an accuracy determination device for comparing said text response to a text set of expected responses and determining whether said text response corresponds to one of said expected responses;
wherein, if said accuracy determination device determines that said text response does not correspond to one of said expected responses within a predetermined accuracy confidence parameter, said accuracy determination device flags said audio response for further review by a user.

13. The speech recognition system of claim 12 further comprising a human interface device for enabling a human operator to view said at least one query and to hear said audio response that corresponds to said at least one query.

14. The speech recognition system of claim 13 wherein said human interface device comprises a personal computer including a monitor for enabling the operator to view said at least one query and an audio speaker device for enabling the operator to listen to said audio response.

15. The speech recognition system of claim 13 wherein said querying device includes a program having an application file, said application file including code which causes the at least one query to be posed to the respondent, a list of expected responses and an address at which a file containing the received audio response will be stored in the storage device.

16. The speech recognition system of claim 14 wherein said querying device includes a program having an application file, said application file including code which causes the at least one query to be posed to the respondent, a list of expected responses and an address at which a file containing the received audio response will be stored in the storage device.

17. The speech recognition system of claim 13 wherein said human interface device includes a graphical user interface on which the operator views said at least one query and said text set of expected responses wherein, after listening to said audio response, the operator is able to select one of said expected responses from said text set of expected responses.

18. The speech recognition system of claim 16 wherein said human interface device includes a graphical user interface on which the operator views said at least one query and said text set of expected responses wherein, after listening to said audio response, the operator is able to select one of said expected responses from said text set of expected responses.

19. The speech recognition system of claim 16 wherein said graphical user interface comprises an application navigation window for enabling the operator to navigate through said at least one query, and an audio navigation window for enabling the operator to control playback of said audio response.

20. The speech recognition system of claim 18 wherein said graphical user interface comprises an application navigation window for enabling the operator to navigate through said at least one query, and an audio navigation window for enabling the operator to control playback of said audio response.

21. The speech recognition system of claim 16 wherein said graphical user interface includes a text entry window which enables the operator to enter a text response if none of said expected responses from said text set of expected responses corresponds to said audio response.

22. The speech recognition system of claim 20 wherein said graphical user interface includes a text entry window which enables the operator to enter a text response if none of said expected responses from said text set of expected responses corresponds to said audio response.

23. A method for transcribing an audio response by using a speech recognition device comprising means for processing of an acoustic file that is tied to database information resulting from a speech recognition application that audibly plays the acoustic file while presenting a screen to a transcriber for transcription and correction of the database information, the method comprising:
- A. posing a query to a respondent;
- B. receiving an audio response from said respondent;
- C. performing a speaker-independent speech recognition analysis on said audio response to transcribe said audio response to a textual response;
- D. recording said audio response;
- E. comparing said textual response to a set of expected responses to said query, said set including a plurality of expected responses to said query in a textual form; and
- F. flagging said audio response for further review by a user, if the corresponding textual response does not correspond to one of said expected responses in said set of expected responses.

24. The method of claim 23 further comprising:
- G. listening to said audio response; and
- H. selecting, from said set of expected responses, a textual response that corresponds to said audio response.

25. The method of claim 23 further comprising:
- G. listening to said audio response; and
- H. manually transcribing a textual response that corresponds to said audio response.

26. A method for transcribing an audio response by using a speech recognition device comprising means for processing of an acoustic file that is tied to database information resulting from a speech recognition application that audibly plays the acoustic file while presenting a screen to a transcriber for transcription and correction of the database information, the method comprising:
- A. constructing a speaker-independent speech recognition application including a plurality of queries and a set of expected responses for each query, said set including a plurality of expected responses to each query in a textual form;
- B. posing each of said queries to a respondent;
- C. receiving an audio response to each query from said respondent;
- D. performing a speech recognition function on each said audio response to transcribe each said audio response to a textual response to each query;
- E. recording each audio response;
- F. comparing each textual response to said set of expected responses for each corresponding query to determine if each textual response corresponds to any of said expected responses in said set of expected responses for the corresponding query; and
- G. for further review by a user, flagging each audio response corresponding to a textual response that does not correspond to one of said expected responses in said set of expected responses to the corresponding query.

27. The method of claim 26 further comprising:
- H. reviewing each flagged audio response to determine if a corresponding expected response is included in said set of expected responses for the query associated with each audio response.

28. The method of claim 27 further comprising selecting, from an associated set of expected responses for each query, a response that corresponds to said flagged audio response.

29. The method of claim 27 further comprising manually transcribing a response that corresponds to each flagged audio response.

30. A method for transcribing an audio response by using a speech recognition device comprising means for processing of an acoustic file that is tied to database information resulting from a speech recognition application that audibly plays the acoustic file while presenting a screen to a transcriber for transcription and correction of the database information, the method comprising:
- A. constructing a speaker-independent speech recognition application including a plurality of queries and a set of expected responses for each query, said set including a plurality of expected responses to each query in a textual form;
- B. posing each of said queries to a respondent with a querying device;
- C. receiving an audio response to each query from said respondent;
- D. performing a speech recognition function on each said audio response with an automatic speech recognition device to transcribe each said audio response to a textual response to each query;
- E. recording each audio response with a recording device;
- F. comparing, with said automatic speech recognition device, each textual response to said set of expected responses for each corresponding query to determine if each textual response corresponds to any of said expected responses in said set of expected responses for the corresponding query; and
- G. for further review by a user, flagging each audio response corresponding to a textual response that does not correspond to one of said expected responses in said set of expected responses to the corresponding query.

31. The method of claim 30 further comprising:
- H. reviewing each flagged audio response with a human interface device to determine if a corresponding textual response is included in said set of expected responses for the query associated with each audio response.

\* \* \* \* \*